Figure 1:
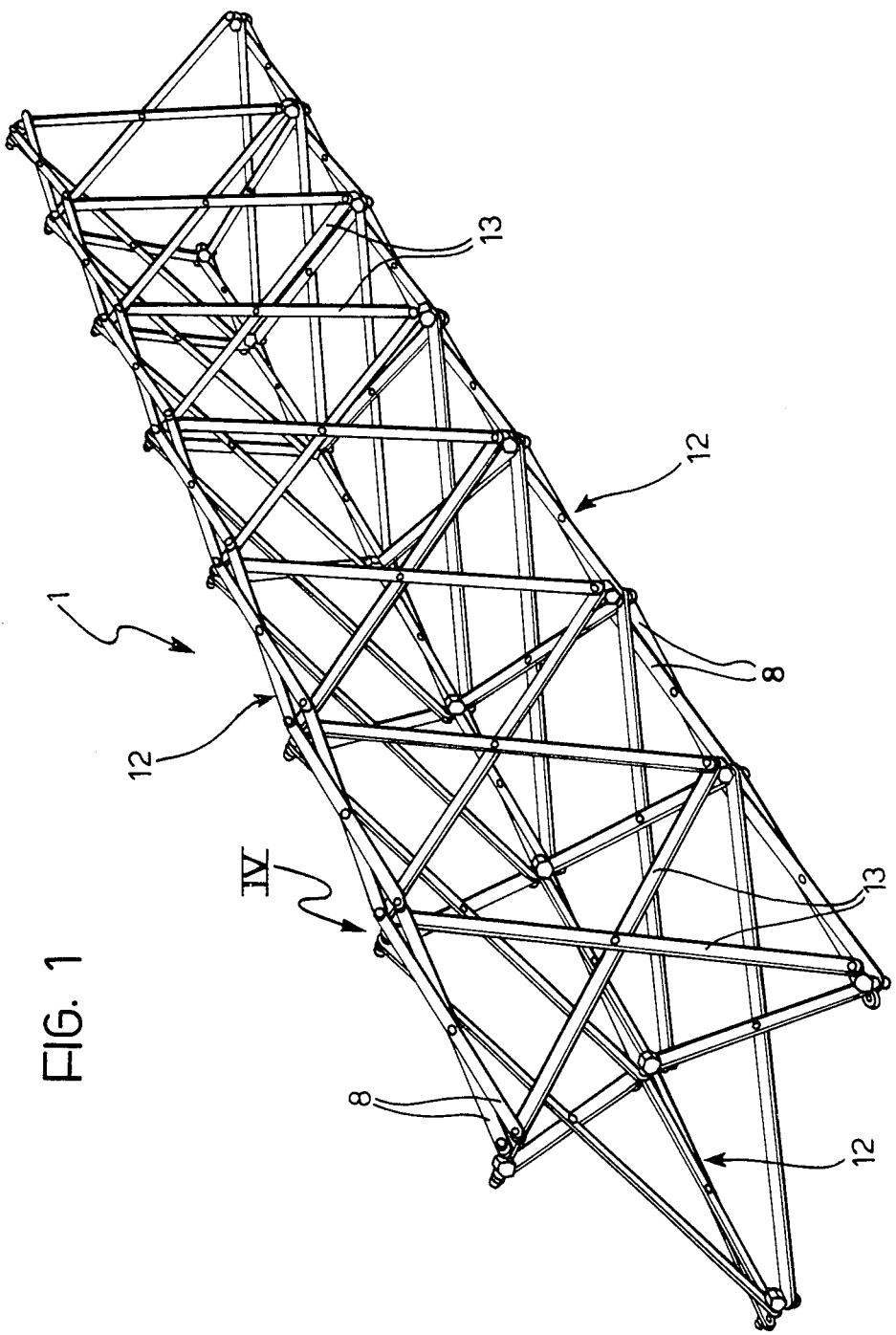

United States Patent [19]

Zanardo

[11] Patent Number: 4,557,083

[45] Date of Patent: Dec. 10, 1985

[54] EXTENSIBLE ARM, PARTICULARLY FOR SPACE MODULES OR VEHICLES

[75] Inventor: Agostino Zanardo, Padua, Italy

[73] Assignee: Aeritalia Societa Aerospaziale Italiana p.A., Turin, Italy

[21] Appl. No.: 654,454

[22] Filed: Sep. 26, 1984

[30] Foreign Application Priority Data

Sep. 30, 1983 [IT] Italy ............................. 68013 A/83

[51] Int. Cl.$^4$ ........................................ E04H 12/18
[52] U.S. Cl. ........................................ 52/109; 244/159
[58] Field of Search ........................ 52/109; 74/521; 244/159, 173; 182/69, 141

[56] References Cited

U.S. PATENT DOCUMENTS

| | | | |
|---|---|---|---|
| 396,175 | 1/1889 | Rüllman | 52/109 |
| 3,375,624 | 4/1968 | Mikulin | 52/109 |
| 3,381,923 | 5/1968 | Berry | 248/166 |
| 3,496,687 | 2/1970 | Greenberg et al. | 52/109 |
| 3,509,576 | 4/1970 | McLain | 343/840 |
| 4,126,974 | 11/1978 | Hardin | 52/109 |
| 4,480,415 | 11/1984 | Truss | 52/121 |

FOREIGN PATENT DOCUMENTS 2941170 6/1981 Fed. Rep. of Germany .

*Primary Examiner*—John E. Murtagh
*Assistant Examiner*—Kathryn L. Ford
*Attorney, Agent, or Firm*—Donald E. Degling

[57] ABSTRACT

In an extensible arm having a reticular lattice structure with a polygonal cross-section, particularly for space modules or vehicles, each longitudinal side of the lattice structure includes first and second kinematic pantograph chains each constituted by a plurality of rods articulated together so as to define a series of aligned X-shaped elements. The rods of the second kinematic chain are shorter than the rods of the first kinematic chain, and the articulations between the X-shaped elements of the second kinematic chain located on one side of the latter coincide with the articulations between the X-shaped elements of the first kinematic chain located on the same side. This lattice structure can adopt any configuration between a fully retracted configuration in which the kinematic chains constituting the structure are all closely packed, and a fully extended configuration in which the rods of the X-shaped elements of the second kinematic chain are substantially parallel to each other so as to define straight struts in correspondence with the vertices of the section of the lattice structure. The rods of the X-shaped elements of the first kinematic chain, however, are disposed as diagonals connecting the struts. The articulated connections between the rods of the first and second kinematic chains are constituted by rotary couplings.

4 Claims, 4 Drawing Figures

EXTENSIBLE ARM, PARTICULARLY FOR SPACE MODULES OR VEHICLES

The present invention relates to an extensible arm having a reticular lattice structure with a polygonal cross-section.

Arms of this type have already been proposed for use in space vehicles to enable the launching or recovery of satellites at a certain distance from the space vehicle intended to transport them.

Extensible arms of this type must have a high value for the ratio between its respective lengths in its fully extended condition and its fully retracted condition, and must have a high degree of rigidity in the fully extended condition or in any partially extended condition.

The object of the present invention is to provide an extensible arm which can satisfy these requirements and at the same time have a simple and reliable structure.

The main characteristic of the extensible arm according to the invention lies in the fact that each longitudinal side of the lattice structure which constitutes the extensible arm includes first and second kinematic pantograph chains each constituted by a plurality of rods articulated together so as to define a series of aligned X-shaped elements, in that the rods of the second kinematic chain are shorter than the rods of the first kinematic chain, and in that the articulations between the X-shaped elements of the second kinematic chain located on one side of the series of X-shaped elements of the second kinematic chain coincide with the articulations between the X-shaped elements of the first kinematic chain located on the same side of the series of X-shaped elements of the first kinematic chain, whereby the lattice structure can adopt any configuration between a fully retracted configuration in which the kinematic chains constituting the structure are all closely packed, and a fully extended configuration in which the rods of the X-shaped elements of the second kinematic chain are substantially parallel to each other so as to define straight struts in correspondence with the vertices of the lattice structure, and the rods of the X-shaped elements of the first kinematic chain are located as diagonals connecting the struts.

Clearly, the structure described above has a unique degree of freedom in that the geometry of the entire arm is univocally defined once the configuration of any one of the X-shaped elements of the various kinematic chains is determined.

By virtue of this advantageous characteristic, it is possible, for example, to effect the extension and the contraction of the arm by acting solely on the basal end of the arm.

In a preferred embodiment, the ratio between the length of the rods constituting the first kinematic chain and the length of the rods constituting the second kinematic chain is equal to $\sqrt{2}$, which means that in the fully extended condition of the arm the rods constituting each X-shaped element of the first kinematic chain are perpendicular to each other.

The cross-section of the arm is preferably triangular, although this section could clearly be constituted by any other suitable polygon.

A further advantage resulting from the aforementioned characteristic lies in the fact that the space within the arm remains completely free whatever the configuration of the arm, unlike several previously proposed solutions in which the space within the arm is occupied, in the retracted condition, by parts of the elements constituting the structure of the arm itself.

Figure 2:
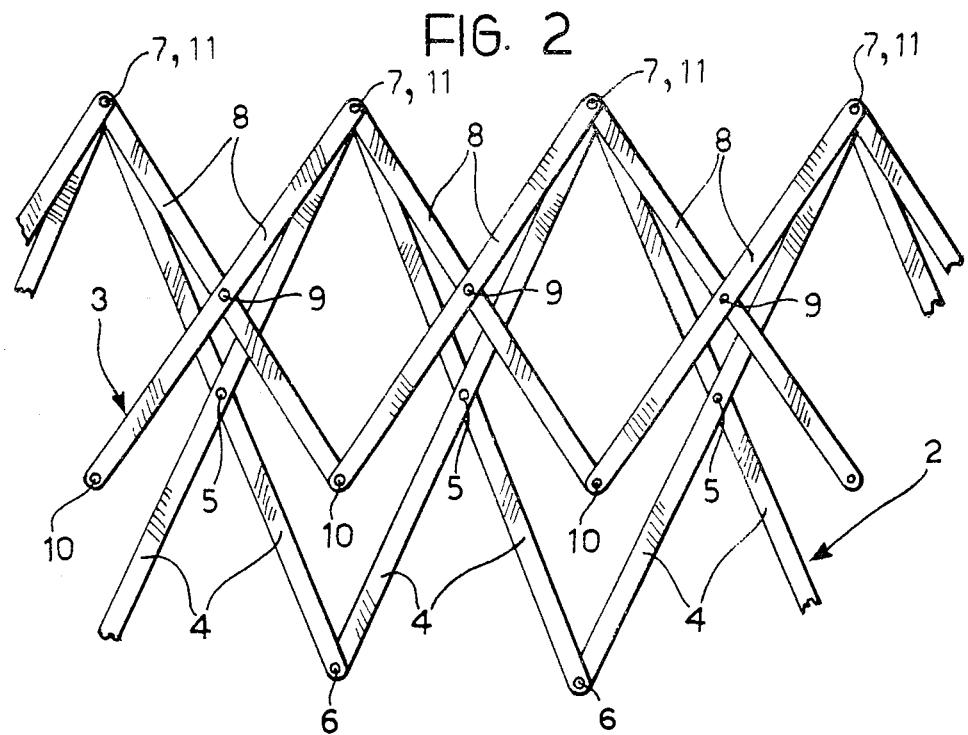
Figure 4:
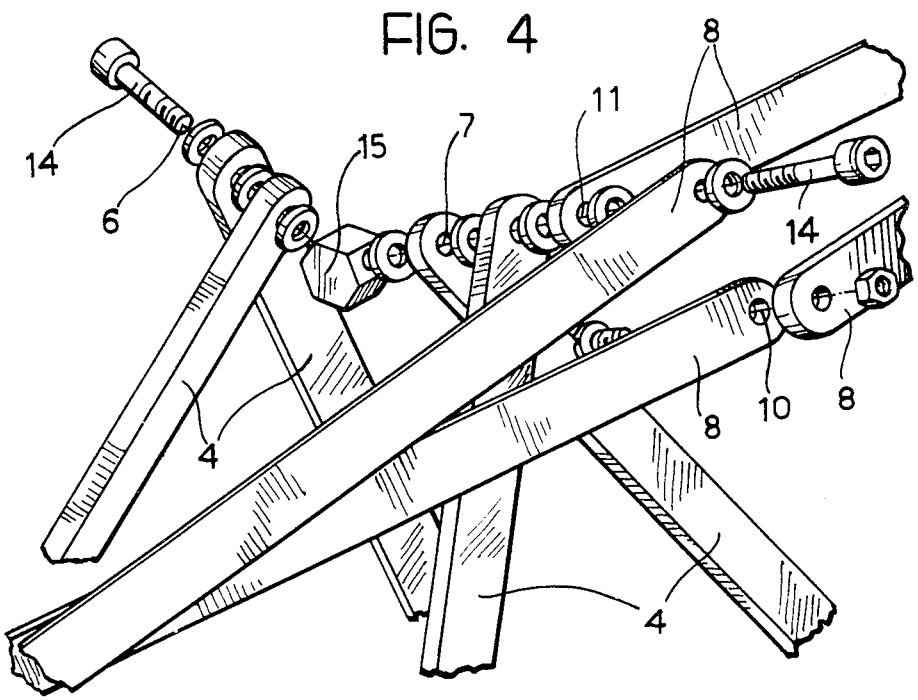
Figure 3:
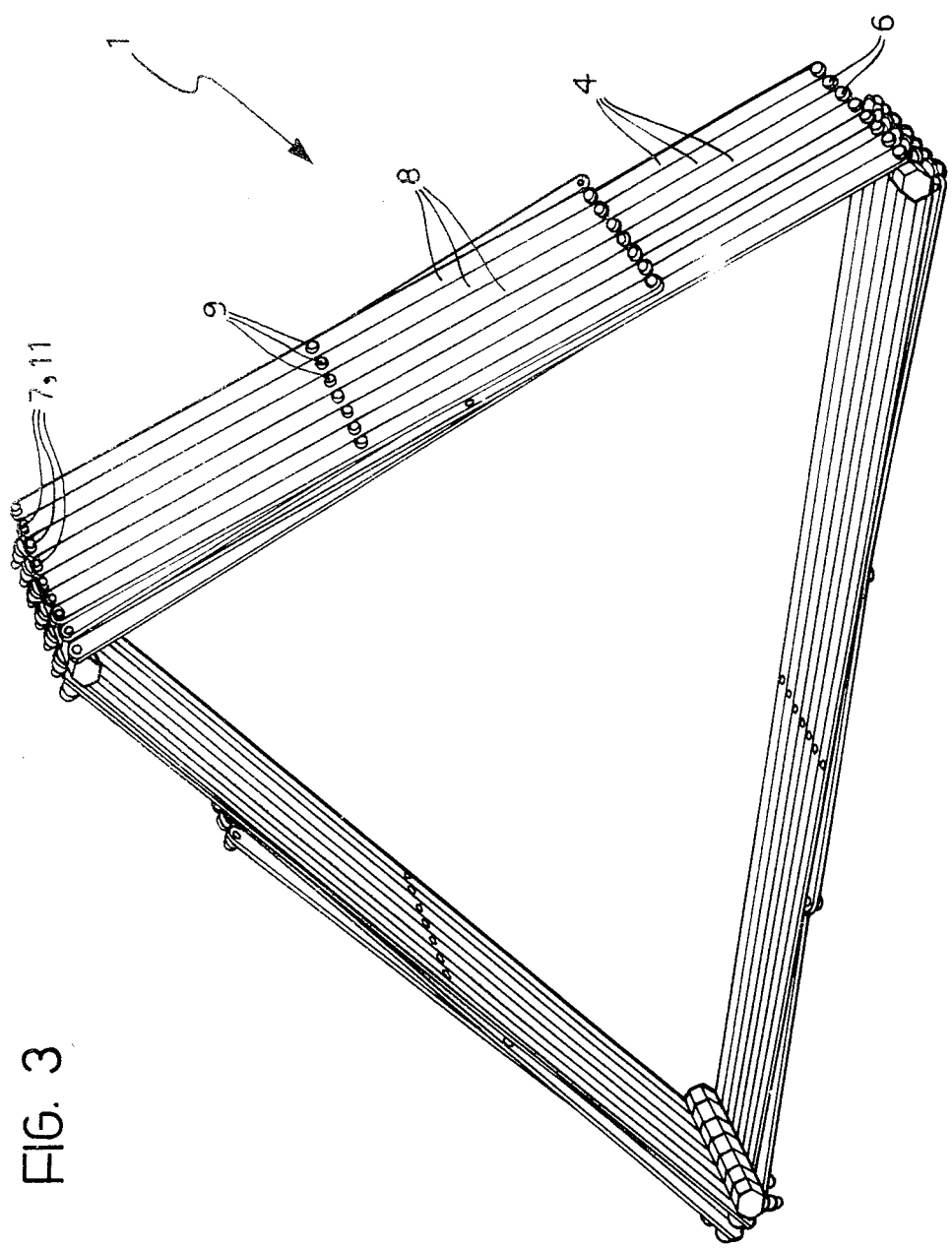

Further characteristics and advantages of the present invention will become apparent from the description which follows with reference to the appended drawings, provided purely by way of non-limiting example, in which:

FIG. 1 is a perspective view of one embodiment of the arm according to the invention in its fully extended condition, FIG. 2 is a view of a part of one side of the arm of FIG. 1 in a partially extended condition, FIG. 3 is a perspective view of the arm of FIG. 1 in its fully retracted condition, and FIG. 4 illustrates a detail of FIG. 1 in perspective and on an enlarged scale.

In the drawings, an extensible arm useable in a spacecraft for the remote launching or recovery of satellites is generally indicated 1.

In the embodiment illustrated, the extensible arm has a reticular lattice structure with a cross-section in the form of an equilateral triangle. The arm therefore has three longitudinal sides, each of which includes a first and a second kinematic pantograph chain indicated 2, 3 respectively in FIG. 2.

The first kinematic pantograph chain 2 is constituted by a plurality of rods 4 of equal length which are articulated together in pairs centrally about articulation axes 5, by means of rotary couplings, so as to constitute a series of aligned X-shaped elements. These X-shaped elements are themselves connected together about articulation axes 6, 7 at the ends of the rods 4 by rotary couplings.

The second kinematic pantograph chain 3 is constituted by a plurality of rods 8 articulated together in pairs centrally about articulation axes 9, by means of rotary couplings, so as to define a series of aligned X-shaped elements which, in their turn, are connected together about articulation axes 10, 11 at the ends of the rods 8 by rotary couplings.

The rods 8 are shorter than the rods 4. More particularly, in the embodiment illustrated in the drawings, the ratio between the length $l_d$ of the rods 4 and the length $l_m$ of the rods 8 is equal to $\sqrt{2}$.

Moreover, as illustrated in FIG. 2, the articulations 11 between the X-shaped elements of the second kinematic chain 3 located on one side of the series of X-shaped elements coincide with the articulations 7 between the X-shaped elements of the first kinematic chain 2 located on the same side.

As already mentioned, the structure described above is identical for each of the three sides of the extensible arm.

By virtue of this structure, the arm 1 can adopt any configuration between the fully extended configuration illustrated in FIG. 1 and the fully retracted condition illustrated in FIG. 3. In the fully extended condition, the rods 8 are located substantially parallel to each other so as to define three longitudinal struts 12 which give the arm a high degree of flexural strength. At the same time, the rods 4 are located in pairs perpendicular to each other so as to constitute diagonals 13 connecting the struts.

The fully retracted condition illustrated in FIG. 3 corresponds to the closure of the kinematic chains 2, 3 constituting each side of the arm 1 into a pack.

By virtue of the structure described above, the arm according to the invention has a high value for the ratio between its respective lengths in its fully extended condition and its fully retracted condition.

Moreover, the arm according to the invention has a high degree of rigidity in any configuration between its fully retracted condition and its fully extended condition.

By virtue of a typical characteristic of each pantograph structure, the arm according to the invention has a unique degree of freedom in that its geometry is univocally defined once the configuration of any of the X-shaped elements of any one of the kinematic chains constituting the structure of the arm is defined. It follows that the movement of the arm may be controlled by acting on any one part of its structure and more particularly on the basal end of the arm. The control means for moving the arm may be constituted by an actuator of any known type and none is illustrated in the appended drawings both to render the latter clearer and simpler to understand and because such control means do not fall within the scope of the present invention.

Clearly, however, the appended drawings illustrate, purely by way of example, a simplified embodiment of the arm according to the invention and the constructional details of the extensible arm may be varied widely with respect to that illustrated without thereby departing from the scope of the present invention.

Thus, FIG. 4 illustrates, purely by way of example, the details of an articulated connection between the rods converging in a single zone of the structure constituting the arm. On one side of the arm are two rods 4 converging towards their respective articulation 6, while on the other side are located two other rods 4 which also converge towards their respective articulation 7 and two rods 8 which converge towards the respective articulation 11 coinciding with the articulation 7. As shown in FIG. 4, the rods in the particular embodiment illustrated are articulated at two pins 14 at an angle of 120° to each other and carried by a single connecting block 15.

A further advantage of the arm according to the invention lies in the fact that all the articulations forming part thereof can be achieved by rotary couplings (that is, with single axes of articulation) which simplifies the manufacture and assembly considerably.

Data relating to two practical embodiments of the extensible arm according to the invention will be given below.

EXAMPLE 1

The first example relates to an arm constituted by tubular rods of aluminum alloy.

The data relating to the X-shaped elements constituting the second kinematic chain 3 forming part of each of the three sides of the arm are as follows:

length of each rod 8: $l_m = 2.12$ m:
external diameter of each rod: $d_{em} = 15$ mm:
internal diameter of each rod: $d_{im} = 13$ mm:
weight of each rod 8: $p_m = 0.250$ Kg
number of X-shaped elements in each kinematic chain 3: $N_m = 47$.

It follows that, in the fully extended condition, the total length of the arm is $L = 47 \times 2.12 = 100$ m. In the fullly retracted condition the length of the arm is 0.72 m.

The characteristics of the rods 4 constituting the first kinematic chain 2 are as follows:

length of each rod 4: $l_d = 3$ m;
weight of each rod 4: $p_d = 0.355$ kg

The external and internal diameters of each rod 4 are identical to the corresponding diameters of each rod 8. The number of X-shaped elements in the first kinematic chain 2 is obviously equal to the number of X-shaped elements in the second kinematic chain 3.

From the data given above, assuming that in the fully extended condition the arm is fixed at one end and is subject at the other end to a load perpendicular thereto of 31.5N, the static deflection of the end of the arm due to this load is equal to $\delta = 0.757$ m (neglecting play).

The critical point load of the extensible arm is $P_E = 13680$N.

EXAMPLE 2

This example relates to an arm which is structurally similar to the preceding one, with the difference that the rods are made of steel.

The length of the arm in the fully extended condition is still 100 m, while in the fully retracted condition is 1.515 m.

The data for the various elements are as follows:
$l_m = 1$ m
$d_{em} = 15$ mm
$d_{im} = 13$ mm
$p_m = 0.343$ kg
$N_m = 100$
$l_d = 1.41$ m
$d_{ed} = 15$ mm
$d_{id} = 13$ mm
$p_d = 0.167$ kg In this case, all the other conditions being the same as in Example 1, one obtains:
$\delta = 1.19$ m
$P_E = 8625$ N The point load of each rod 8 is 8527 N (1328N in the case of Example 1).

Naturally, the principle of the invention remaining the same, the constructional details and the embodiments may be varied widely with respect to that described and illustrated purely by way of example without thereby departing from the scope of the present invention.

I claim:

1. Extensible arm having a reticular lattice structure with a polygonal cross-section, particularly for space modules or vehicles, wherein each longitudinal side of the lattice structure includes first and second kinematic pantograph chains arranged in the same plane each constituted by a plurality of rods articulated together so as to define a series of aligned X-shaped elements, in that the rods of the second kinematic chain are shorter than the rods of the first kinematic chain, and in that the articulation axes between the X-shaped elements of the second kinematic chain located on one side of the series of X-shaped elements of the second kinematic chain coincide with the articulation axes between the X-shaped elements of the first kinematic chain located on the same side of the series of the X-shaped elements of the first kinematic chain, whereby the lattice structure can adopt any configuration between a fully retracted configuration in which the kinematic chains constituting the structure are all closely packed, and a fully extended configuration in which the rods of the X-shaped elements of the second kinematic chain are substantially parallel to each other so as to define straight struts in correspondence with the vertices of the lattice structure, and the rods of the X-shaped elements of the first kinematic chain are located as diagonals connecting the struts.

2. Extensible arm according to claim 1, wherein the articulated connections between the rods of the first and the second kinematic chains are constituted by rotary couplings.

3. Arm according to claim 1, wherein the ratio between the length of the rods of the first kinematic chain and the length of the rods of the second kinematic chain is equal to $\sqrt{2}$.

4. Extensible arm according to claim 1 wherein the cross-section of the arm is triangular in shape in the fully retracted position, in the fully extended position, and in all intermediate positions.

* * * * *